W. H. FULLER.
VEHICLE LOCK.
APPLICATION FILED APR. 15, 1914.
1,167,688.
Patented Jan. 11, 1916.
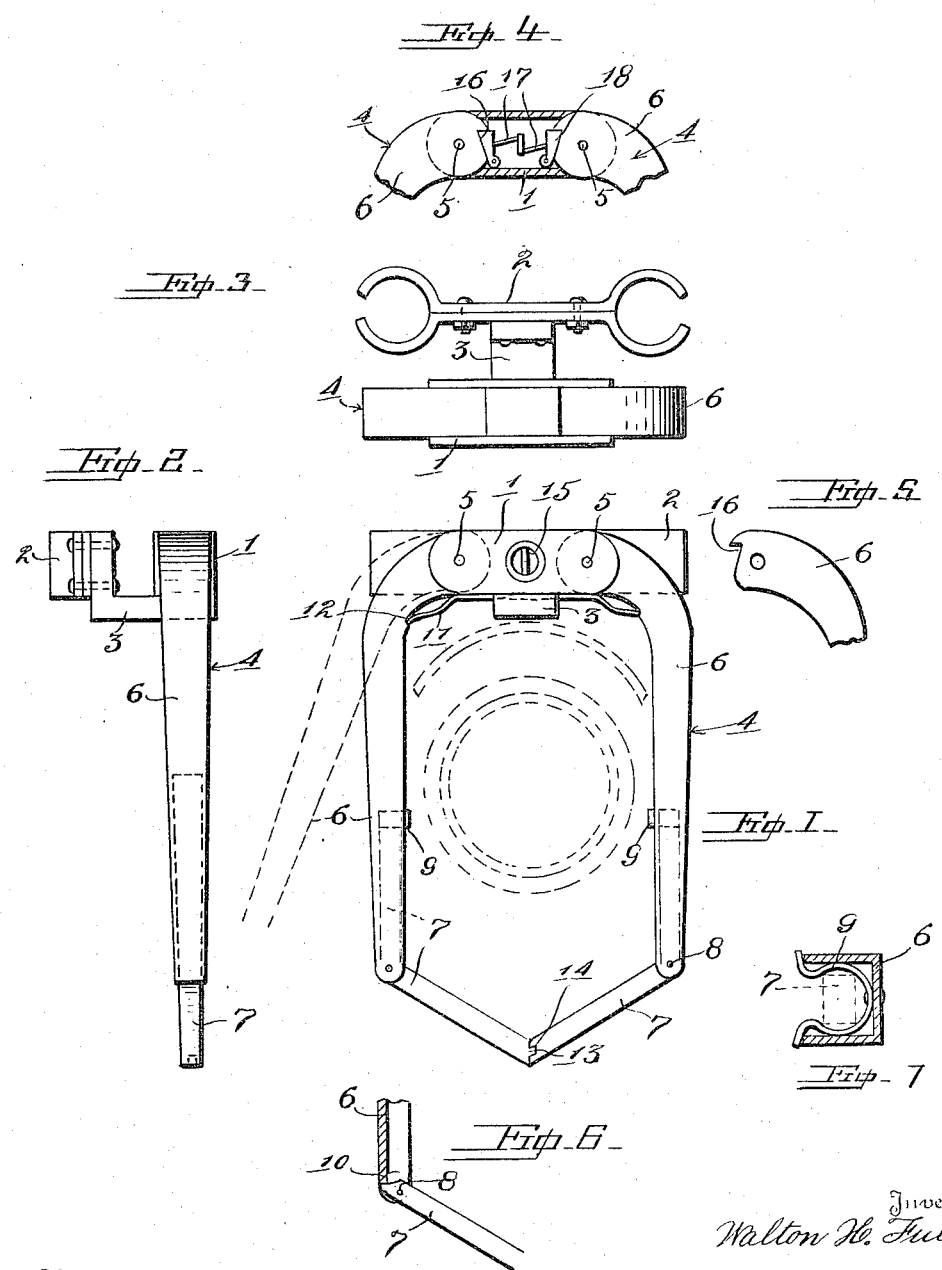

UNITED STATES PATENT OFFICE.

WALTON H. FULLER, OF SACRAMENTO, CALIFORNIA.

VEHICLE-LOCK.

1,167,688.  Specification of Letters Patent.  Patented Jan. 11, 1916.

Application filed April 15, 1914. Serial No. 832,110.

*To all whom it may concern:*

Be it known that I, WALTON H. FULLER, a citizen of the United States, residing at Sacramento, in the county of Sacramento and State of California, have invented certain new and useful Improvements in Vehicle-Locks, of which the following is a specification.

This invention relates to an improved cycle lock, and the purpose of the device is to provide a means for locking the rear wheel of a cycle in such a way as to make it an impossibility to use the cycle when so locked, thus preventing loss by theft.

The invention, as a further object, contemplates a structure wherein the locking device is directly attached to a non-working part of the cycle, the said device being of the key operated type, and so arranged relatively to the rear wheel as to bind the same and render the cycle useless as a vehicle until the device is unlocked.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Figure 1 is an elevation of the lock complete; Fig. 2 is an edge view; Fig. 3 is a top plan view; Fig. 4 is a fragmentary sectional view illustrating the interior lock mechanism; Fig. 5 is a fragmentary elevation of one of the locking arms; Fig. 6 is a fragmentary view; and Fig. 7 is an enlarged section of one of the arms.

Before proceeding with the description of the drawings, I desire to call particular attention to the fact that while I have evolved my invention with reference to its application in connection with bicycles, the same may be readily utilized as a locking element for various cycles or vehicles susceptible of its application.

Referring now to the drawings by numerals, 1 designates the lock case to be fastened by means of a suitable clamp 2 and bracket 3 to the rear fork of a bicycle in such a way that the lock is held firmly in position over the rear wheel, the latter being indicated in cross section by the dotted lines of Fig. 1. From the sides of the lock case protrude a pair of "caliper-like" arms designated each as an entirety by the numeral 4, the said arms being pivoted at one end within the lock case as indicated at 5 to work in a vertical plane, that is, move up and down. Each of these arms is made up of two main parts or pieces; namely, the main arm 6 and an extension or locking arm 7. The main arm 6 is of solid steel from its pivot point within the lock case, to a point a little over half its length, from which point, to its lower end, it is channel shaped or longitudinally grooved as indicated in Fig. 7 of the drawings. The extension or locking arm 7 is pivoted as at 8 within the channel or groove of the main arm and at the free end thereof and is adapted, when not in use, to fold like the blade of a jack-knife into the said groove or channel where it is held incased by means of a suitable spring member 9. To release, slight pressure upon each side of the spring 9 will permit the extension or arm 7 to drop or fall into locking position by gravity. The pivot point 8, or rather the joint, is such in its nature that the extension arm cannot open farther than shown by the full lines in Fig. 1, this being made possible by the engagement of the main arm 6 with a notch 10 of the extension.

When the device is unlocked, the arms 4 are held open and in the position indicated by the dotted lines in the said Fig. 1 by a flat or plate like spring 11 secured to the under side of the lock case, the ends of the spring being adapted for engagement with notches 12 cut in the under side of the said arms. The pressure of the spring is sufficient to maintain the arms slightly spread, and to prevent, except when forced, the dropping of the arms into a locking position.

To lock the device after releasing extension arms as hereinbefore explained, it is but necessary to press the two main arms 4 together between the thumb and fore finger, bringing points of extension arms together between the spokes of the wheel, the device automatically locking itself rigidly in this position. Upon application to the said Fig. 1, it will be noted that one of the extension arms 7 is provided with a tenon 13 while the other of the said arms has a mortise 14 formed therein, the latter receiving the former to effect a rigid joint. When it is desired that the lock be released, it is only necessary to insert a suitable key within an opening 15 of the lock case, give said key a half turn, and, by such action, release the arms 4 whereupon the tension of spring 11 will force said arms apart to permit disengagement of the mortise and tenon, and, if desired, movement of the extensions 7 in the path of a circle until incased within the main arms 6 and held therein by the springs 9 above noted.

The locking mechanism inclosed in the lock case is quite simple. The inclosed end of each arm 6 terminates in a half circle, into the periphery of which is cut a horizontal groove 16. Pivoted in any suitable manner within the lock case and held in position by suitable springs 17, are two pivoted pawls 18 of such size and shape as to fall into ratchet groove when arms are pressed into position between the spokes of the wheel, thereby preventing their opening without removal of the lugs or pawls from the grooves which can be accomplished only by insertion of a proper key in the opening 15 of the case.

From the above, taken in connection with the accompanying drawings it is apparent that the action of the lock, upon the turning of the key in an unlocking operation is automatic, the spring 11 serving to spread the arms 4 to in this manner disengage the locking arms or extensions 7; that the said extensions 7 can only be folded into the position indicated in dotted lines in the said Fig. 1 when the arms 4 are unlocked or spread; and that the engagement between the arms 6 and the extensions 7 is such in its nature as to maintain the latter whereby to provide for the reception of the tenon 13 within the mortise therefor.

Having thus fully described my invention, what I claim as new and desire to secure by Letters Patent, is:—

1. In a vehicle lock, relatively movable arms, one of the said arms being longitudinally grooved, an extension pivoted to the grooved arm, means to lock and unlock the arms, said extension being immovable relatively to the arms when locked, and spring means to releasably hold the extension within the groove in the unlocked position of the arm.

2. A lock for vehicles including a pair of relatively movable locking arms, an extension pivoted to the free end of each arm, the respective extensions being engageable one with the other in the locked position of the arms, means operating automatically to withdraw the extensions from engagement one with the other upon an unlocking of the arms, and means maintaining the extensions in locking engagement when the arms are locked.

3. A lock for vehicles including a pair of relatively movable locking arms, an extension pivoted to the free end of each arm, the free end of one of the said extensions having a recess formed therein, a tenon formed upon the free end of the other of the said extensions, said tenon being adapted for engagement with said recess in the locked position of the arms to render the extensions immovable relatively to each other, and means actuatable to lock and unlock said arms, as and for the purpose set forth.

4. A lock for vehicles including a pair of relatively movable locking arms, means actuatable to lock and unlock the arms, an extension pivoted to the free end of each arm, means limiting movement of the extensions, means maintaining the extensions in engagement with each other in the locked position of the arms, the respective extensions being foldable relatively to the arms in the unlocked position of the latter, and spring means engaging the respective extensions when folded to releasably hold the said extensions immovable relatively to the arms.

5. A lock for vehicles including a pair of relatively movable arms, each of the said arms being grooved longitudinally throughout a portion of its length, means actuatable to lock and unlock the arms, an extension pivoted to the free end of each arm, the said extensions being foldable within the respective grooves in the unlocked position of the arms.

6. A lock for vehicles including a pair of relatively movable locking arms, mechanism actuatable to lock and unlock said arms, each of the said arms being grooved throughout a portion of its length, an extension pivoted to the free end of each arm, means upon one extension and engageable with the other extension to lock the extensions immovable relatively to each other in the locked position of the arms, means engageable with the arm to spread the same apart when unlocked, the said extensions being foldable within the groove aforesaid, and means engaging the extensions when folded to maintain the extensions incased.

7. A lock for vehicles including a pair of relatively movable arms, each of the said arms being grooved longitudinally throughout a portion of its length, an extension pivoted to each arm, means actuatable to maintain the extensions in engagement one with the other in the locked position of the arms, and means engaging the respective extensions when folded to releasably hold the said extensions within the groove aforesaid, the said extensions being foldable in the unlocked position of the arms, as and for the purpose set forth.

In testimony whereof I affix my signature in presence of two witnesses.

WALTON H. FULLER.

Witnesses:
G. E. BANVARD,
A. B. DAUGER.

Copies of this patent may be obtained for five cents each, by addressing the "Commissioner of Patents, Washington, D. C."